(12) United States Patent
Crumb et al.

(10) Patent No.: US 11,620,704 B2
(45) Date of Patent: Apr. 4, 2023

(54) METHOD AND GUI FOR SETTLEMENT OF COMMODITY CONTRACTS DENOMINATED IN COMMODITY CONTRACT TOKENS

(71) Applicant: ABAXX TECHNOLOGIES CORP., Christ Church (BB)

(72) Inventors: Joshua Crumb, Christ Church (BB); Andrew Fedak, Christ Church (BB); Christopher A. Wiklof, Everett, WA (US)

(73) Assignee: ABAXX TECHNOLOGIES CORP., Christ Church (BB)

( * ) Notice: Subject to any disclaimer, the term of this patent is extended or adjusted under 35 U.S.C. 154(b) by 220 days.

(21) Appl. No.: 16/708,398

(22) Filed: Dec. 9, 2019

(65) Prior Publication Data
US 2020/0184560 A1 Jun. 11, 2020

Related U.S. Application Data
(60) Provisional application No. 62/776,803, filed on Dec. 7, 2018.

(51) Int. Cl.
*G06Q 20/40* (2012.01)
*G06Q 20/06* (2012.01)
(Continued)

(52) U.S. Cl.
CPC .......... *G06Q 40/04* (2013.01); *G06Q 20/047* (2020.05); *G06Q 20/065* (2013.01); *G06Q 20/26* (2013.01);
(Continued)

(58) Field of Classification Search
CPC ............................. G06Q 40/04; G06Q 20/047
See application file for complete search history.

(56) References Cited

U.S. PATENT DOCUMENTS

2017/0345011 A1* 11/2017 Salami ................... G06Q 20/10
2018/0068359 A1* 3/2018 Preston ............. G06Q 30/0283
(Continued)

OTHER PUBLICATIONS

Mills, et al., in "Distributed ledger technology in payments, clearing, and settlement," from Finance and Economics Discussion Series, 2016 (Year: 2016).*

*Primary Examiner* — Mike Anderson
*Assistant Examiner* — Brandon M Duck
(74) *Attorney, Agent, or Firm* — Panitch Schwarze Belisario & Nadel LLP

(57) ABSTRACT

A computer method and graphical user interface (GUI) for settlement of a commodity contract includes displaying, on an electronic display of a first user device, a GUI for receiving input of information related to a particular commodity smart contract for transfer of a commodity, receiving input data including information related to commodity attributes from a first user via the GUI, displaying a commodity price field in the GUI, transferring the received input data to a server computer, displaying a commit object in the GUI receiving input from the commit object, transmitting a commitment to the server computer to cause the server computer to establish a smart commodity contract for the commodity, and displaying, in the GUI on the electronic display, a receipt acknowledgement object indicating that the smart contract is established and the first user is obligated to abide by the smart contract.

18 Claims, 5 Drawing Sheets

(51) Int. Cl.
*G06Q 20/36* (2012.01)
*G06Q 20/26* (2012.01)
*G06Q 30/06* (2012.01)
*G06Q 40/04* (2012.01)
*G06Q 30/0601* (2023.01)
*G06Q 20/04* (2012.01)

(52) U.S. Cl.
CPC ....... *G06Q 20/367* (2013.01); *G06Q 30/0611* (2013.01); *G06Q 30/0641* (2013.01)

(56) References Cited

U.S. PATENT DOCUMENTS

| | | | | |
|---|---|---|---|---|
| 2018/0341910 | A1* | 11/2018 | Broveleit | G06Q 10/0833 |
| 2019/0172566 | A1* | 6/2019 | Schulman | G16H 10/60 |
| 2019/0294822 | A1* | 9/2019 | Hennebert | |
| 2019/0370905 | A1* | 12/2019 | Hu | G06Q 40/08 |
| 2020/0151709 | A1* | 5/2020 | Bryan | G06Q 20/3672 |
| 2020/0151817 | A1* | 5/2020 | Mabfouz | G06Q 40/04 |
| 2020/0294142 | A1* | 9/2020 | Edkins | G06Q 20/405 |
| 2021/0004923 | A1* | 1/2021 | Mackenzie | G06Q 50/184 |
| 2022/0327551 | A1* | 10/2022 | Tietze | G06Q 30/018 |

* cited by examiner

US 11,620,704 B2

METHOD AND GUI FOR SETTLEMENT OF COMMODITY CONTRACTS DENOMINATED IN COMMODITY CONTRACT TOKENS

CROSS-REFERENCE TO RELATED APPLICATIONS

The present application claims priority benefit from U.S. Provisional Patent Application No. 62/776,803, entitled "SYSTEM AND METHOD OF SETTLEMENT OF COMMODITY CONTRACTS DENOMINATED IN COMMODITIES," filed Dec. 7, 2018, which application, to the extent not inconsistent with the disclosure herein, is incorporated herein by reference.

SUMMARY

According to an embodiment, a computer method for use with a graphical user interface (GUI) for settlement of a commodity contract includes displaying, on an electronic display of a first user device, a first GUI for receiving input of information related to a particular commodity smart contract for transfer of a commodity. The computer method includes receiving, from a first user via the first GUI, input data including information related to commodity attributes. The computer method includes displaying a commodity price field in the first GUI, wherein the commodity price is denominated in second commodity contract tokens. The computer method includes transferring the received input data to a server computer, displaying, via the first GUI, a first commit object for receiving a user commitment to purchase a commodity contract, receiving input via the first commit object, and transmitting a commitment to the server computer to cause the server computer to establish a smart commodity contract for the commodity, the commitment corresponding to the input received from the first commit object. The computer method includes displaying, in the first GUI on the electronic display, a receipt acknowledgement object, the receipt acknowledgement object indicating that the smart contract is established and the first user is obligated to abide by the smart contract.

According to an embodiment, a computer method for settlement of a commodity contract includes establishing a smart contract for a transfer of a commodity, and writing the smart contract onto a distributed ledger and issuing at least one first token representing the smart contract for the transfer of the commodity. The computer method includes receiving, from a buyer, a second token representing a second smart contract for transfer of a second commodity, and transferring, to the buyer, the first token.

DETAILED DESCRIPTION

Figure 1:
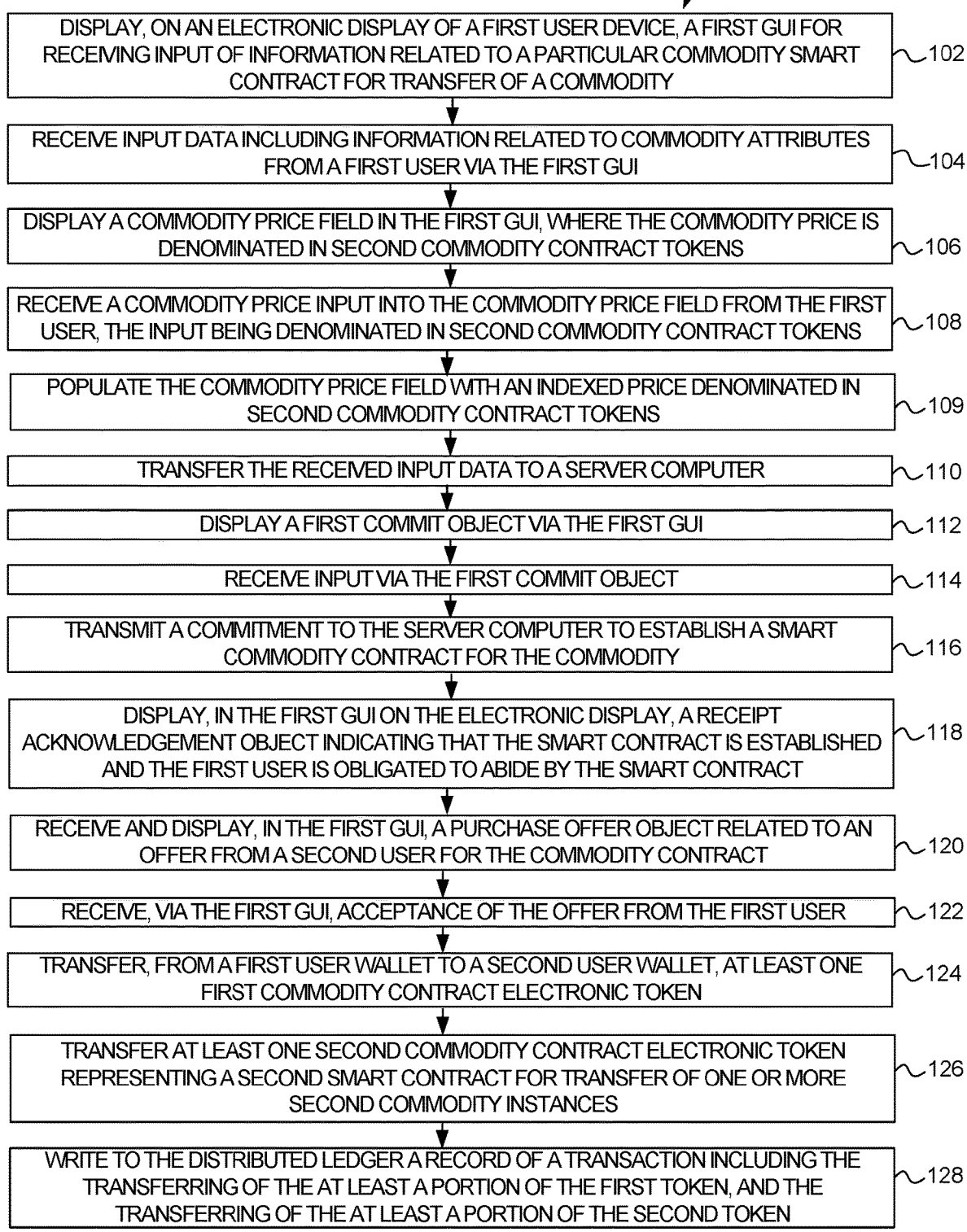
FIG. 1 is a flow chart showing a computer method for settlement of a commodity contract, using a graphical user interface (GUI), according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

As used herein, the term "seller" will be understood to be, as indicated by context, interchangeable with "owner", "offering party" or "user". The "seller" will be understood to mean a user with authority to offer a commodity contract for sale, using a smart contract carried by a distributed ledger. The term "buyer" will be understood to be, as indicated by context, interchangeable with "counterparty" or "second user". The "buyer" will be understood to mean a user with authority to purchase the commodity contract from the "seller". The inventors contemplate that commodity contracts may be bought and sold multiple times before delivery to an ultimate user, and thus a user who is a "buyer" in a first transaction offering instance may become a "seller" in a second transaction offering instance.

Figure 2:
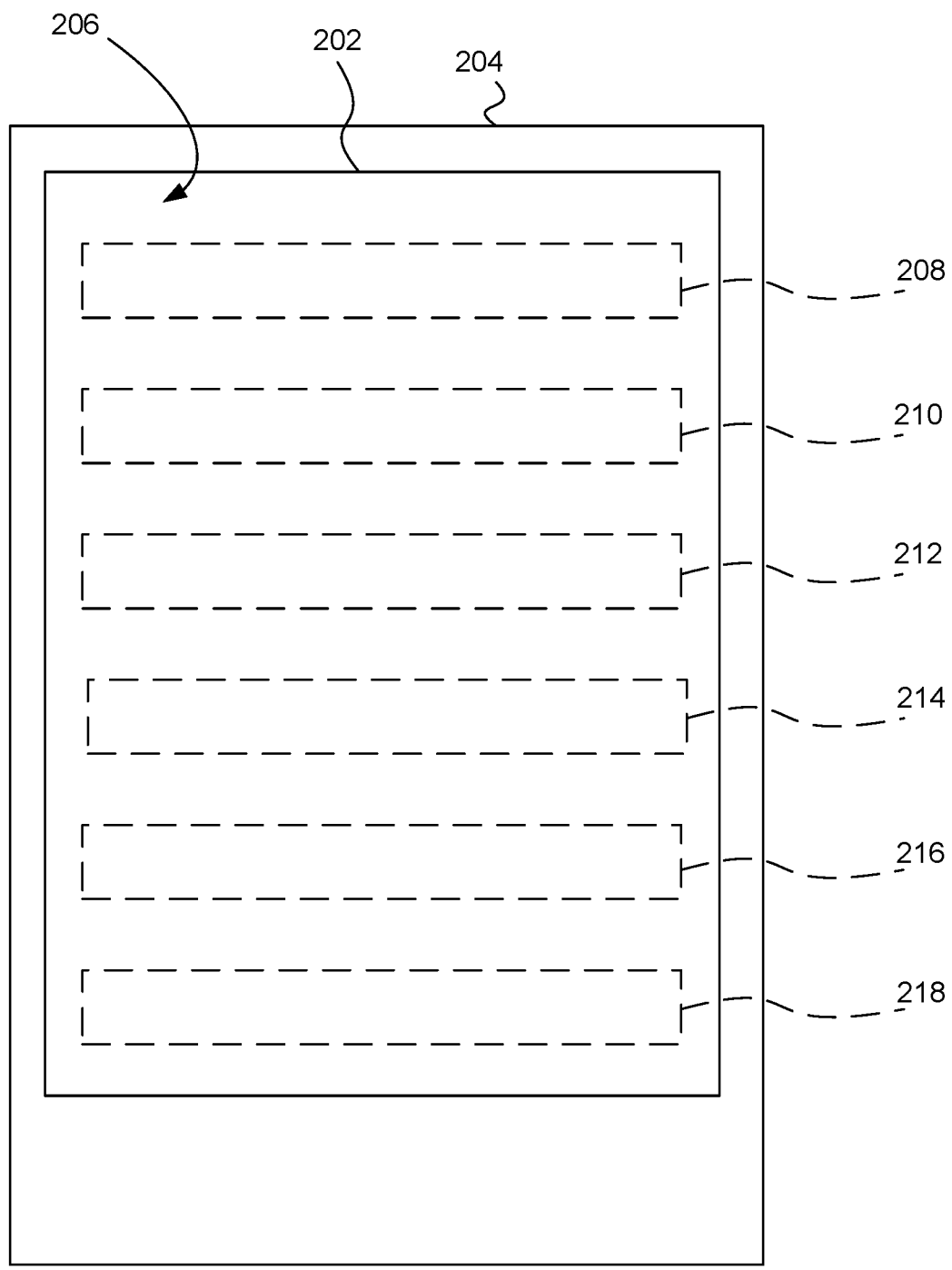
FIG. 2 is a diagram of the GUI described in conjunction with the computer method of FIG. 1, according to an embodiment.
Figure 5:
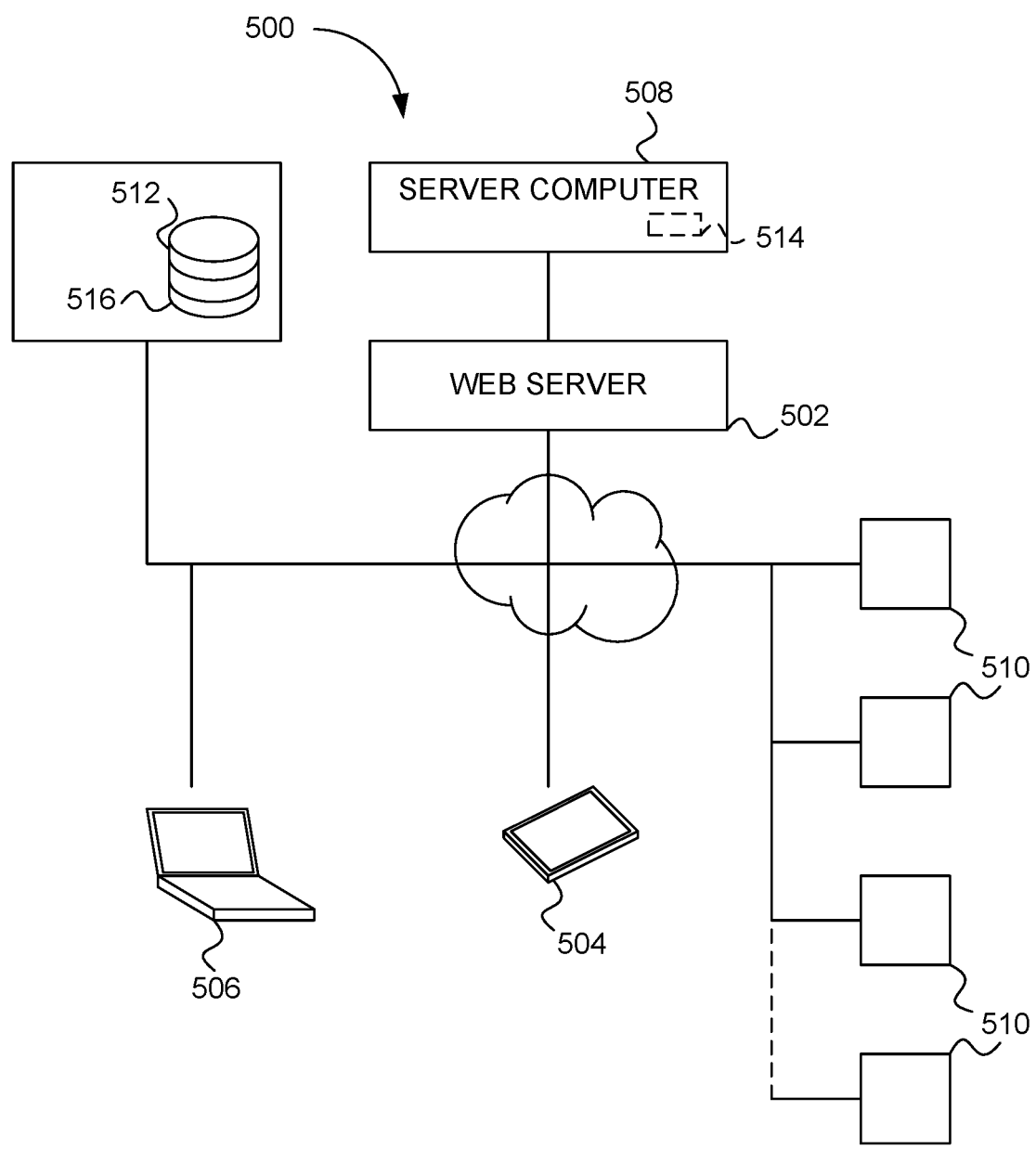
FIG. 5 is a block diagram of a computer system configured to administer a commodity material transaction using a distributed ledger, according to an embodiment.

FIG. 1 is a flow chart showing a computer method 100 for settlement of a commodity contract, using a graphical user interface (GUI) 206, according to an embodiment. FIG. 2 is a diagram showing the GUI 206 described in conjunction with the computer method 100 of FIG. 1, according to an embodiment. FIG. 5 is a block diagram of a computer system 500 configured to administer a commodity material transaction using a distributed ledger, according to an embodiment.

Referring to FIGS. 1, 2, and 5, a computer method 100 for settlement of a commodity contract includes, in step 102, displaying, on an electronic display 202 of a first user device 204, a first GUI 206 for receiving input of information related to a particular commodity smart contract for transfer of a commodity. Step 104 includes receiving, from a first user via the first GUI 206, input data including information related to commodity attributes 208. Step 106 includes displaying a commodity price field 210 in the first GUI 206, wherein the commodity price is denominated in second commodity contract tokens. Step 110 includes transferring the received input data to a server computer 508. Step 112 includes displaying, via the first GUI 206, a first commit object 212 for receiving a user commitment to purchase a commodity contract. Step 114 includes receiving input via the first commit object 212. Step 116 includes transmitting a commitment to the server computer 508 to cause the server computer to establish a smart commodity contract for the commodity, the commitment corresponding to the input received from the first commit object. The server may write access to the smart contract to a distributed ledger carried by a plurality of computer memories in a plurality of user devices 510.

Step 118 includes displaying, in the first GUI 206 on the electronic display 202, a receipt acknowledgement object 214, the receipt acknowledgement object 214 indicating that the smart contract is established and the first user is obligated to abide by the smart contract.

According to an embodiment, the computer method 100 further includes, in step 108, receiving a commodity price input into the commodity price field 210 from the first user, the input being denominated in second commodity contract tokens.

According to an embodiment, the computer method 100 further includes, in step 109, populating the commodity price field 210 with an indexed price denominated in second commodity contract tokens.

According to an embodiment, the computer method 100 further includes, in step 120, receiving, from the server computer, and displaying, in the first GUI 206, a purchase offer object 216 related to an offer from a second user for the commodity contract.

According to an embodiment, causing the server computer to establish the smart commodity contract for the commodity, in step 116, includes the causing of the server computer to write the smart contract onto a distributed ledger, and to issue at least one particular commodity contract electronic token representing the commodity contract. In another embodiment, causing the server computer to write the smart contract onto a distributed ledger, in step 116, includes causing the server computer to record the smart contract on the distributed ledger spanning a plurality of nodes residing on a plurality of networked devices 510.

Figure 3:
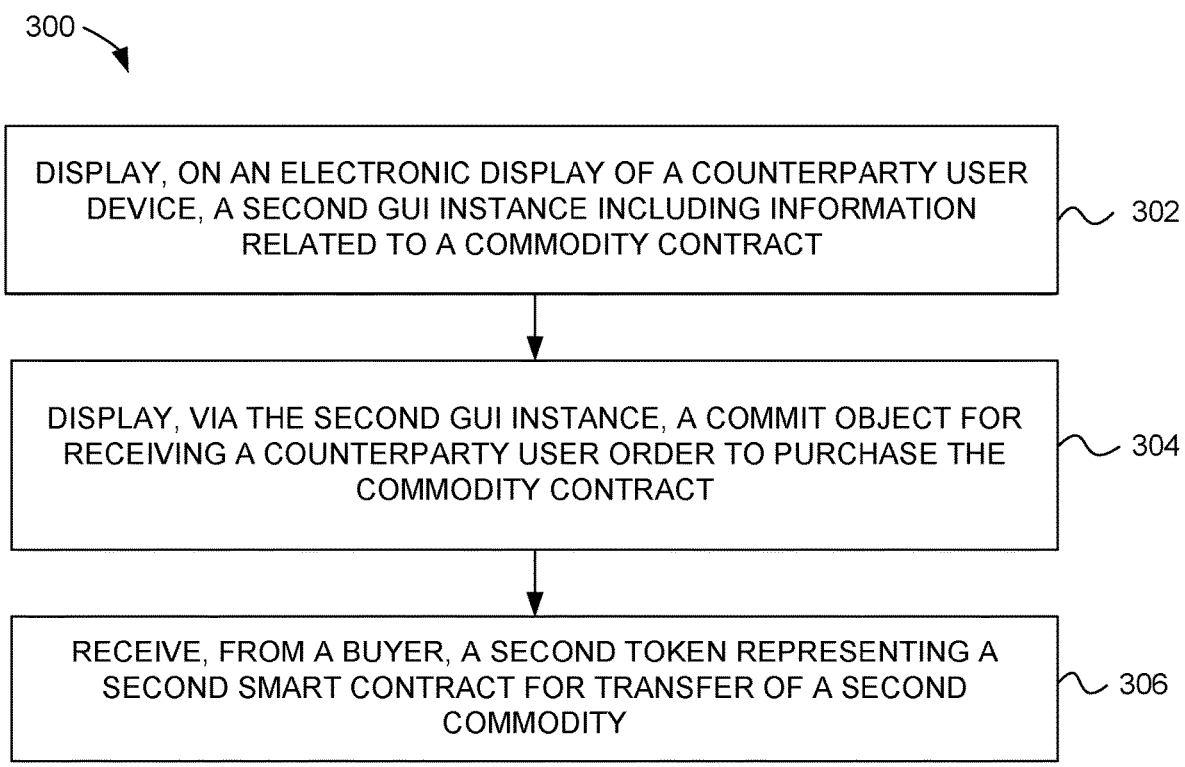
FIG. 3 is a flow chart showing a computer method and GUI for settlement of a commodity contract, according to an alternative embodiment.

FIG. 3 is a flow chart showing a computer method 300 for presenting the commodity contract to a counterparty user, according to an embodiment. According to an embodiment, the computer method 300 includes, in step 302, displaying, on an electronic display of a counterparty user device, a second GUI, the second GUI including information related to the commodity contract. In an embodiment, the second GUI may be a different GUI than the first GUI. In another embodiment, the second GUI may be a different instance of the first GUI.

Step 304 includes displaying, via the second GUI, a second commit object for receiving a counterparty user order to purchase the commodity contract. Step 306 includes receiving a counterparty user commit command from the counterparty user via the second commit object. Receiving the counterparty user commit command from the counterparty user via the second commit object may cause the server computer to transmit and cause display, in the first GUI, the purchase offer object 218 related to the offer from the counterparty user for the commodity contract.

According to an embodiment, referring to FIGS. 1-3 and 5, the computer method 100, 300 further includes, in step 122, receiving, via the first GUI, acceptance of the offer from the first user, using an accept object 218 to cause, in step 124, transferring, from a first user wallet to a second user wallet, at least a portion of the at least one commodity contract first token, the commodity contract first token representing ownership of the commodity contract. Step 126 includes transferring, into the first user wallet from the second user wallet, at least a portion of at least one second commodity contract electronic token representing a second smart contract for ownership transfer of one or more second commodity instances. Step 128 includes writing, with the server computer to the distributed ledger, a record of a transaction including the transferring, from the first user wallet to the second user wallet, the at least a portion of the at least one commodity contract first token, the transferring, from the second user wallet to the first user wallet, of the at least a portion of the at least one second commodity contract token. The transference of the first and second commodity contract tokens may cause a transference of ownership of the first and second commodity contract instances.

According to an embodiment, the particular commodity smart contract comprises a futures contract including a future delivery date. In another embodiment, the particular commodity is a physical commodity. Additionally and/or alternatively, the particular commodity includes one or more of a fuel, an unrefined fuel, a metal, a food, and a building material. In another embodiment, the second commodity is a physical commodity. The second commodity may include one or more of a fuel, an unrefined fuel, a metal, a food, and a building material. Additionally and/or alternatively, the second commodity is a different type of commodity than the first commodity.

According to an embodiment, the computer method 100, 300 further includes outputting, via a graphical buyer interface, a notification to the buyer that the first token has been transferred to the buyer.

According to an embodiment, the distributed ledger is written in one or more computer readable memories. In an embodiment, the distributed ledger includes a blockchain. The blockchain may include one or more of a public blockchain, a private blockchain and a permissioned blockchain.

According to an embodiment, the smart contract is added to the distributed ledger as a transaction. In one embodiment, adding the smart contract to the distributed ledger includes encrypting the smart contract. In another embodiment, adding the smart contract to the distributed ledger includes storing the smart contract at one or more cloud locations, encrypting the one or more cloud locations, and entering the encrypted one or more cloud locations onto the distributed ledger as a transaction.

Figure 4:
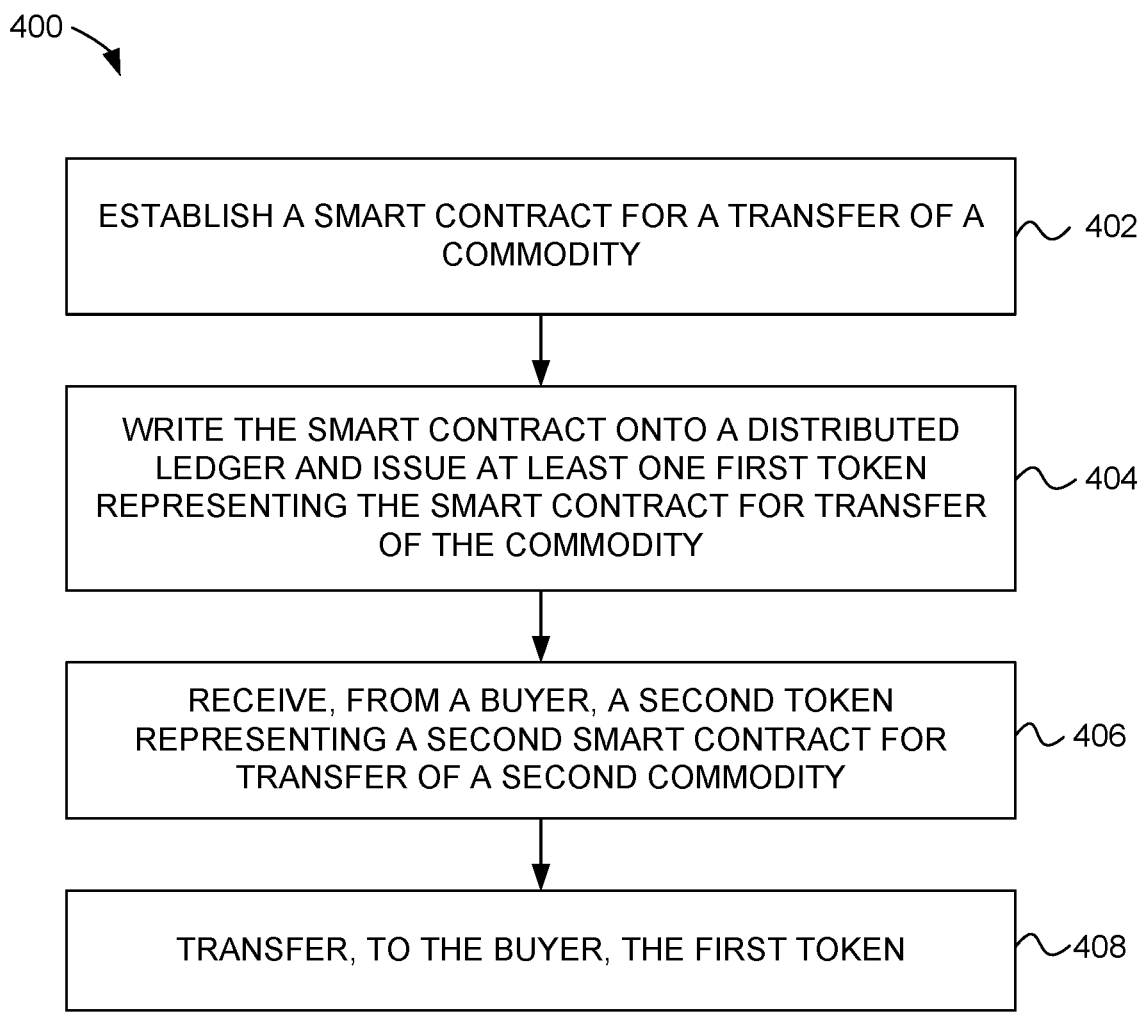
FIG. 4 is a flow chart showing a computer method for settlement of a commodity contract, according to an embodiment.

FIG. 4 is a flow chart showing a computer method 400 for settlement of a commodity contract, according to an embodiment.

According to an embodiment, the computer method 400 for settlement of a commodity contract includes, in step 402, establishing a smart contract for a transfer of a commodity. Step 404 includes writing the smart contract onto a distributed ledger and issuing at least one first token representing the smart contract for the transfer of the commodity. Step 406 includes receiving, from a buyer, a second token representing a second smart contract for transfer of a second commodity. Step 408 includes transferring, to the buyer, the first token.

According to an embodiment, receiving, from the buyer, the second token representing the second smart contract for the transfer of the second commodity in step 406, and transferring, to the buyer, the first token in step 408, correspond to buying the first token with the second token. According to another embodiment, receiving, from the buyer, the second token representing the second smart contract for the transfer of the second commodity in step 406, and transferring, to the buyer, the first token in step 408, correspond to trading the second token for the first token.

According to an embodiment, the computer method 400 further includes establishing a value of the first token in a cryptocurrency, and establishing a value of the second token in the cryptocurrency.

According to an embodiment, the computer method 400 further includes receiving a request from the buyer to buy the first token with the second token, determining whether the value of the second token in the cryptocurrency is greater than the value of the first token in the cryptocurrency, and if the value of the second token is greater than the value of the first token, granting the request to buy the first token with the second token and crediting, to an account of the buyer, an amount of the cryptocurrency corresponding to a difference between the value of the second token and the value of the first token.

According to an embodiment, the computer method 400 further includes if the value of the second token is greater than the value of the first token, granting the request to buy the first token with the second token and debiting, from the account of the buyer, an amount of the cryptocurrency corresponding to a difference between the value of the first token and the value of the second token.

According to an embodiment, the computer method 400 further includes establishing the value of the first token in a fiat currency, and establishing the value of the second token in the fiat currency.

According to an embodiment, the computer method 400 further includes receiving a request from the buyer to buy the first token with the second token, determining whether the value of the second token in the fiat currency is greater than the value of the first token in the fiat currency, and if the value of the second token is greater than the value of the first token, granting the request to buy the first token with the second token and crediting, to the account of the buyer, an amount of the fiat currency corresponding to a difference between the value of the second token and the value of the first token.

According to an embodiment, the computer method 400 further includes if the value of the second token is greater than the value of the first token, granting the request to buy the first token with the second token and debiting, from the account of the buyer, an amount of the fiat currency corresponding to a difference between the value of the first token and the value of the second token.

According to an embodiment, in step 406, receiving, from the buyer, the second token representing the second smart contract for the transfer of the second commodity includes receiving multiple second tokens from the buyer representing the second smart contract.

According to an embodiment, the computer method 400 further includes determining a value of the at least one first token, determining a value of the one or more second tokens; and determining a number of the second tokens sufficient to purchase the first token.

According to an embodiment, the computer method 400 further includes determining whether the buyer owns the number of second tokens sufficient to purchase the first token. In an embodiment, if the buyer owns the number of second tokens sufficient to purchase the first token, receiving, from the buyer, the second token representing the second smart contract for the transfer of the second commodity, in step 406, includes receiving the number of second tokens sufficient to purchase the first token. In another embodiment, the computer method 400 further includes, if the buyer does not own the number of second tokens sufficient to purchase the first token, determining an amount of currency sufficient to make up a difference between the value of the first token and the number of second tokens owned by the buyer, and debiting, from the account of the buyer, the amount of the currency sufficient to make up the difference.

According to an embodiment, the currency is a cryptocurrency. In another embodiment, the currency is a fiat currency.

According to an embodiment, the first commodity is a physical commodity. In an embodiment, the first commodity includes one or more of a fuel, an unrefined fuel, a metal, a food, and a building material.

According to an embodiment, the second commodity is a physical commodity. In an embodiment, the second commodity includes one or more of a fuel, an unrefined fuel, a metal, a food, and a building material. In another embodiment, the second commodity is a different type of commodity than the first commodity.

According to an embodiment, the computer method 400 further includes outputting, via a graphical buyer interface, a notification to the buyer that the first token has been transferred to the buyer.

According to an embodiment, the distributed ledger is written in one or more computer readable memories. In one embodiment, the distributed ledger includes a blockchain. In another embodiment, the blockchain includes a public blockchain. Additionally and/or alternatively, the blockchain includes a private blockchain. In another embodiment, the blockchain includes a permissioned blockchain.

According to an embodiment, the smart contract is added to the distributed ledger as a transaction. In an embodiment, adding the smart contract to the distributed ledger includes encrypting the smart contract. In an alternative embodiment, adding the smart contract to the distributed ledger includes storing the smart contract at one or more cloud locations, encrypting the one or more cloud locations, and entering the encrypted one or more cloud locations onto the distributed ledger as a transaction.

FIG. 5 is a block diagram of a computer system 500 configured to administer a commodity material transaction using a distributed ledger, according to an embodiment. As used herein, the term distributed ledger will be understood to include blockchains of various ilks. Illustrated elements described in conjunction with this figure may be described elsewhere herein and may bear dissimilar reference numbers. Corresponding elements will be understood as equivalent as indicated by context.

According to an embodiment, the computer system 500 may include a web server 502 configured to output a first GUI to a first device 504 for a party to receive and display information related to a commodity material transaction smart contract, according to an embodiment. The web server 502 may be further configured to output a second GUI to a second device 506 for a counterparty to receive and display information related to a commodity material transaction smart contract, according to an embodiment. The computer system 500 may include a server computer 508, operatively coupled to the web server 502, and configured to execute data transfer and distributed ledger transactions. The server computer 508 may be further configured to transmit display data to and receive user input from the web server 502, for relay to and from the first and second devices 504, 506.

According to an embodiment, the computer system 500 may include a plurality of devices 510 operatively coupled to the web server 502 and carrying the distributed ledger. The web server 502 may be configured to transmit the distributed ledger transactions to the plurality of devices 510, according to an embodiment. The plurality of devices 510 may be configured to collectively validate the distributed ledger transactions, according to an embodiment. The web server 502 may be configured to receive and forward collective validation to the server computer 508, according to an embodiment.

According to an embodiment, the server computer 508 may be further configured to transfer a first cryptocurrency and/or digital security associated with commodity transactions corresponding to transactions between a counterparty wallet 512 and a transaction wallet 514 via the web server 502. The server computer 508 may issue a distributed ledger token corresponding to one or more commodity material transactions, according to an embodiment.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for use with a graphical user interface (GUI) for settlement of a commodity contract, the method comprising:
    displaying, on an electronic display of a first user device, a first GUI for receiving input of information related to a particular commodity smart contract for transfer of a commodity;
    receiving, from a first user via the first GUI, input data including information related to commodity attributes;
    displaying a commodity price field in the first GUI, wherein the commodity price is denominated in second commodity contract tokens;
    transferring the received input data to a server computer;
    displaying, via the first GUI, a first commit object for receiving a user commitment to purchase a commodity contract;
    receiving input via the first commit object;
    transmitting a commitment to the server computer to cause the server computer to establish a smart commodity contract for the commodity, the commitment corresponding to the input received from the first commit object, wherein the causing of the server computer to establish the smart commodity contract for the commodity includes causing the server computer to write the smart contract onto a distributed ledger that includes a blockchain by recording the smart contract as a transaction on the distributed ledger spanning a plurality of nodes residing on a plurality of networked devices, and to issue at least one particular commodity contract electronic token representing the commodity contract such that the plurality of networked devices are configured to collectively validate the transaction, wherein writing the smart contract to the distributed ledger further includes:
        storing the smart contract at one or more cloud locations,
        encrypting the one or more cloud locations, and
        entering the encrypted one or more cloud locations onto the distributed ledger as the transaction;
    displaying, in the first GUI on the electronic display, a receipt acknowledgement object, the receipt acknowledgement object indicating that the smart contract is established and the first user is obligated to abide by the smart contract;
    receiving, via the first GUI, acceptance of the offer from the first user, using an accept object to cause:
        transferring, from a first user wallet to a second user wallet, at least a portion of the at least one commodity contract first token, the commodity contract first token representing ownership of the commodity contract;
        transferring, into the first user wallet from the second user wallet, at least a portion of at least one second commodity contract electronic token representing a second smart contract for ownership transfer of one or more second commodity instances; and
        writing, with the server computer to the distributed ledger, a record of a transaction including the transferring, from the first user wallet to the second user wallet, the at least a portion of the at least one commodity contract first token, the transferring, from the second user wallet to the first user wallet, of the at least a portion of the at least one second commodity contract token.

2. The computer method of claim 1, the method further comprising:
    receiving a commodity price input into the commodity price field from the first user, the input being denominated in second commodity contract tokens.

3. The computer method of claim 1, the method further comprising:
    populating the commodity price field with an indexed price denominated in second commodity contract tokens.

4. The computer method of claim 1, the method further comprising:
    receiving, from the server computer, and displaying, in the first GUI, a purchase offer object related to an offer from a second user for the commodity contract.

5. The computer method claim 1, the method further comprising:
    displaying, on an electronic display of a counterparty user device, a second GUI, the second GUI including information related to the commodity contract;
    displaying, via the second GUI, a second commit object for receiving a counterparty user order to purchase the commodity contract; and
    receiving a counterparty user commit command from the counterparty user via the second commit object;
    wherein receiving the counterparty user commit command from the counterparty user via the second commit object causes the server computer to transmit and cause display, in the first GUI, the purchase offer object related to the offer from the counterparty user for the commodity contract.

6. The computer method of claim 1, wherein the transference of the first and second commodity contract tokens causes a transference of ownership of the first and second commodity contract instances.

7. The computer method of claim 1, wherein the particular commodity smart contract comprises a futures contract including a future delivery date.

8. The computer method of claim 1, wherein the particular commodity is a physical commodity.

9. The computer method of claim 8, wherein the particular commodity includes one or more of a fuel, an unrefined fuel, a metal, a food, and a building material.

10. The computer method of claim 9, wherein the second commodity is a physical commodity.

11. The computer method of claim 10, wherein the second commodity includes one or more of a fuel, an unrefined fuel, a metal, a food, and a building material.

12. The computer method of claim 10, wherein the second commodity is a different type of commodity than the first commodity.

13. The computer method of claim 1, further comprising outputting, via a graphical buyer interface, a notification to the buyer that the first token has been transferred to the buyer.

14. The computer method of claim 1, wherein the distributed ledger is written in one or more computer readable memories.

15. The computer method of claim 1, wherein the blockchain includes a public blockchain.

16. The computer method of claim 1, wherein the blockchain includes a private blockchain.

17. The computer method of claim 1, wherein the blockchain includes a permissioned blockchain.

18. The computer method of claim 1, wherein adding the smart contract to the distributed ledger comprises encrypting the smart contract.

\* \* \* \* \*